United States Patent
Brookner et al.

(10) Patent No.: US 7,171,392 B2
(45) Date of Patent: Jan. 30, 2007

(54) SECURE DATA CAPTURE APPARATUS AND METHOD

(75) Inventors: George Brookner, Norwalk, CT (US); Roman Kresina, Oxford, CT (US); Lorenz Frey, Zuchwill (CH)

(73) Assignee: Ascom Hasler Mailing Systems Inc, Shelton, CT (US)

( * ) Notice: Subject to any disclaimer, the term of this patent is extended or adjusted under 35 U.S.C. 154(b) by 130 days.

(21) Appl. No.: 10/491,261

(22) PCT Filed: Oct. 5, 2002

(86) PCT No.: PCT/US02/33474

§ 371 (c)(1),
(2), (4) Date: Mar. 30, 2004

(87) PCT Pub. No.: WO03/044621

PCT Pub. Date: May 30, 2003

(65) Prior Publication Data

US 2004/0193547 A1 Sep. 30, 2004

Related U.S. Application Data

(60) Provisional application No. 60/339,530, filed on Nov. 16, 2001.

(51) Int. Cl.
*G06F 17/00* (2006.01)
*G07B 17/02* (2006.01)

(52) U.S. Cl. .................. 705/401; 705/404; 705/410; 705/60; 380/51; 235/494

(58) Field of Classification Search ............ 705/60–69, 705/401, 404, 403, 410; 380/51; 235/494
See application file for complete search history.

(56) References Cited

U.S. PATENT DOCUMENTS

| | | | | | |
|---|---|---|---|---|---|
| 4,649,266 | A | * | 3/1987 | Eckert | 705/62 |
| 4,873,645 | A | * | 10/1989 | Hunter et al. | 700/231 |
| 4,888,803 | A | * | 12/1989 | Pastor | 380/51 |
| 4,934,846 | A | * | 6/1990 | Gilham | 705/60 |
| 5,019,991 | A | * | 5/1991 | Sansone et al. | 705/407 |
| 5,181,245 | A | * | 1/1993 | Jones | 705/61 |
| 5,448,641 | A | * | 9/1995 | Pintsov et al. | 705/60 |

(Continued)

OTHER PUBLICATIONS

The Future of Snail Mail (US Postal Service is investing $5 bil in a 10-year automation project that will use bar-coding as core technology; service attempts to effectively compete in information age) (Information Week, p. 43+, Dec. 4, 1995.*

(Continued)

*Primary Examiner*—James P. Trammell
*Assistant Examiner*—Cristina Owen Sherr
(74) *Attorney, Agent, or Firm*—Oppedahl & Olson LLP

(57) ABSTRACT

In a postage meter system (FIG. 2), a user enters information,indicative of a batch of mail pieces to be franked (30). The mail pieces are franked(31), and when the batch is completed, data relating to the batch are made the subject of a cryptographic engine(33). The data digitally signed, or a message authentication code (MAC) is derived, all in a postal security device (PSD)(32). The data are communicated(34), preferably by means of public-key cryptography (35). These data are then made available to the postal authority in a secure way.(36)

24 Claims, 2 Drawing Sheets

U.S. PATENT DOCUMENTS

| | | | |
|---|---|---|---|
| 5,675,651 A | | 10/1997 | Bailleux et al. |
| 5,682,429 A | * | 10/1997 | Cordery et al. ............... 705/60 |
| 5,805,711 A | | 9/1998 | Windel et al. |
| 5,822,739 A | * | 10/1998 | Kara .......................... 705/410 |
| 5,987,441 A | | 11/1999 | Lee et al. |
| 6,005,945 A | * | 12/1999 | Whitehouse ................. 380/51 |
| 6,108,643 A | * | 8/2000 | Sansone ...................... 705/62 |
| 6,321,214 B1 | * | 11/2001 | Thiel .......................... 705/408 |
| 6,362,724 B1 | * | 3/2002 | Rosenau .................... 340/5.2 |
| 6,868,443 B1 | | 3/2005 | Deslandes |
| 2003/0097337 A1 | * | 5/2003 | Brookner et al. ............. 705/60 |

OTHER PUBLICATIONS

Mail fraud: the bottom line at the USPS. (United States Postal Service), Gillespie, Nick, (Business and Society Review, No. 96, p. 42-44, Wntr 1996).*

More Snails in the Mail. Tyler, Geoff, (Management Services, v46n2, p. 22-25, Feb. 2002 (includes Illustration Photography).*

* cited by examiner

SECURE DATA CAPTURE APPARATUS AND METHOD

This application claims priority from U.S. application Ser. No. 60/339,530, filed Nov. 16, 2001, which application is hereby incorporated herein by reference.

The application relates generally to franking machines (postage meters) and systems that include franking machines. The application relates more particularly to capturing data regarding batches of franked pieces (mail pieces) and handling such data in a secure way.

BACKGROUND

Postage meters offer many benefits to postal authorities when compared with postage stamps. If there is a rate change, postage-stamp customers need to be provided with stamps of new denominations. In contrast, postage meter customers merely set their meters to the new rates. Postage-stamp customers stand in line at post offices, making it necessary to provide postal clerks to sell the stamps individually, while meter customers purchase postage in bulk. Indeed in many jurisdictions meter customers purchase postage electronically, so that no postal clerk is needed to handle the purchase.

For these and other reasons, some postal authorities offer discounts or special postal rates for mail satisfying certain conditions. A batch of mail pieces which are all of the same class of service, or which are sorted or bundled in a particular way, or which are sufficient in number to satisfy some count minimum, may qualify for a discount. Some such discounts may be provided for postage meter customers based on meter usage.

A typical embodiment for a discount procedure would take into account the usage per class or category. With this data a discount per customer may be calculated. The number of different mail classes or categories may be more than one hundred.

Historically in many jurisdictions, many discounts are obtained through physical submission of paperwork at the time of mailing. This is, of course, error-prone and awkward. Many postal authorities seek to shift as many processes as possible from manual and paper-based approaches to approaches that use electronic communications.

It will be appreciated that postal authorities wish to avoid giving discounts or rebates that exceed the discount or rebate to which the postal patron is entitled. In a paper-based system the postal authority is concerned, among other things, with the authenticity and accuracy of the information on the paper forms. In an electronic system the postal authority is likewise concerned with the authenticity and accuracy of the electronically communicated information. But those skilled in the art are well aware of instances in which seemingly secure systems, even systems administered by the military and government agencies, are penetrated by members of the general public. Security flaws are routinely uncovered from time to time in commonly used software and operating systems. A postal authority contemplating the establishment of a discount system employing electronically communicated information may well be apprehensive that some party might, through some tampering or other malfeasance, cause the postal authority to give a greater discount than that to which the party is entitled. Likewise it might be worried that one party might gain access to a discount to which some other party is entitled.

There is thus a great need for apparatus and method permitting a postal authority to capture data regarding discountable events such as batches of mail satisfying certain conditions, and to receive such data free of most concerns regarding its correctness and authenticity.

It will be appreciated that some postal customers purchase the services of mailing houses and other service providers. The mailing house may receive mail pieces from a customer and frank them (apply postage to them) and then pass them into the mail stream. In another approach, the mailing house may print and insert the mail pieces, and frank and mail them, so that the postal customer need not perform any of the steps but merely pays for the services as well as the postage. While it is the mailing house that has the direct relationship with the meter-setting service provider and with the postal authorities, depending on the terms of the discount it may be a discount to which the postal customer (and not the mailing house) is entitled.

Thus, an alternate scenario where postal statistics and data capture are becoming important is for third-party printing, where a postal security device (PSD) is used on different postage printing bases (PPBs) for different customers, or where several PSDs are used on the same PPB for different customers.

There is thus a great need for apparatus and method which permit a postal customer to purchase services from a mailing house, and yet which permit the batch activities of the individual postal customer to be securely reported to the postal authority so that appropriate discounts may be provided.

Prior-art approaches for handling batches of mail include those of U.S. Pat. No. 4,873,645 to Hunter et al., U.S. Pat. No. 5,987,441 to Lee et al., U.S. Pat. No. 5,019,991 to Sansone et al., and U.S. Pat. No. 4,888,803 to Pastor. None of these approaches is fully satisfactory in its handling of the problems and needs discussed here.

SUMMARY OF THE INVENTION

In a postage meter system, a user enters information indicative of a batch of mail pieces to be franked. The mail pieces are franked, and when the batch is completed, data relating to the batch are made the subject of a cryptographic engine. The data are digitally signed, or a message authentication code (MAC) is derived, all in a postal security device (PSD). The data are communicated to a server, where the data are authenticated, preferably by means of public-key cryptographic means. These data are then made available to the postal authority in a secure way.

Customer accounting is based on statistical data gathered by the postage printing base. Such data may be accumulated and stored in the PSD or in the postage printing base outside of the PSD. The cryptographic protection inherent in the PSD, of the sensitive data, effectively detects or prevents tampering. In addition effective backup and recovery mechanisms may be put into place to protect customer as well as third-party interests. In order to assure the authenticity and accuracy of the data collected, the use of a PSD solves both the guarantee of authenticity and accuracy of the data collected for use by the postal authority. Using the data collected by the PSD as input for the calculation of the discount allows for payback calculations due the customers (or allows for giving customers credit for future services).

Data may be stored in small amounts and for relatively short periods of time in the PSD, cryptographically signed, and then stored for longer periods of time in the base (but not in the PSD) until a convenient time for a TMS data upload.

When a mailpiece is franked, stored statistical data may include the mailpiece category, weight, or amount. This is added to a like batch history. Should a mailpiece be the first of its type or category, a new batch identifier with the mailpiece identity may be established in the storage location.

DESCRIPTION OF THE DRAWINGS

The invention will be described with respect to a drawing in several figures, of which.

DETAILED DESCRIPTION

Before the method according to the invention is described in detail, a typical system according to the invention will be described.

Figure 1:
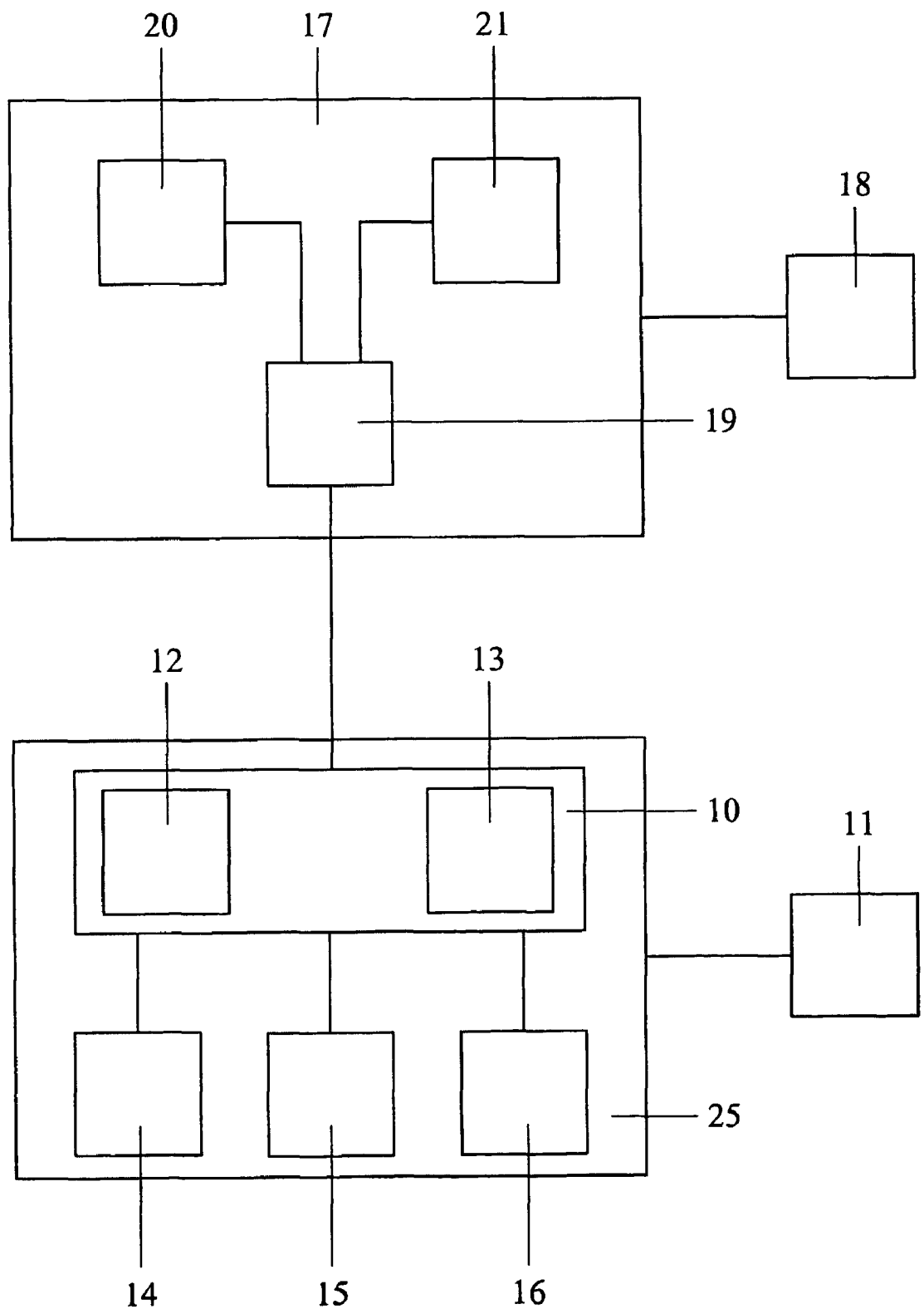
FIG. 1 shows in functional block diagram form a system according to the invention.

FIG. 1 shows the system within which the capturing, archiving and transmission of statistics occur. The KMS Components 17 represent the infrastructure where the statistics are decoded and saved or archived prior to transmission the Postal Authorities. The Postal Statistics Service 20 provides the medium which collects, formats, parses the statistics in the manner required by the Post. The Host Services 21 provide other services as access to funds, Public Keying activities, etc. The Communications Router 19 is the application which provides the interface and protocol (e.g. TCP/IP & sockets) to the external world, outside of the infrastructure.

The PPB (postage printing base) 10 which forms part of Local System 25 is the customer-resident hardware and software required to operate a PSD 12 and its associated interfaced components. The PSD 12 has within its secure cryptographic boundaries battery-backed random access memory and static electrically erasable programmable read only memory (EEPROM). These are the components, acting together that provide the security and integrity of the statistics captured by the PSD. The Barcode Reader 14, Static Scale 15 and Dynamic Scale 16 are typical peripherals that can be associated with the PPB as data input devices.

Users 11 interface with the system 25. The postal authority 18 interfaces with the KMS Components 17.

The acronym "TMS" (for "TeleMeter Setting System") is used to denote a certain PSD external entity entitled to perform privileged operations on the indicia application (like downloading of funds). The acronym "KMS" (for "Key Management System") is used to denote a certain PSD external entity entitled to perform privileged operations related to the management of cryptographic material, and non-funds activities such as data exchange discussed herein.

The PSD 12 is a multiple-chip-embedded module designed as a single electronic circuit board with interfaces to a serial external port and a power supply. The board is enclosed with a tamper detecting "continuity" mesh and sealed in a hard opaque heat-transferring potting compound. Together these elements both conceal the electronic circuitry and provide for cryptographic security and tamper detection and response. Further, tampering cannot occur without significant visual damage to the potting material, board or board components. No physical access to the PSD (e.g. battery replacement) is possible.

The PPB 10 exists in various different implementations, e.g. as an embedded system or powerful PC (open system) Host component. In general the PPB may carry out the non-sensitive operations and store and handle non-critical (or appropriately protected) data. It has at its disposal an ample amount of memory while the speed of computation may be slow for certain cryptographic calculations such as long-integer math.

The PSD 12 is the trusted computing base of the meter system and as such the center point of security. The PSD holds the postage a customer may spend subsequently. Depending on the jurisdiction, it may store an ascending register and a descending register. The PSD does all the sensitive computations for the postal funds download operations as well as for the calculation of indicia data and stores all postal counters (ascending/descending register, item counter) and cryptographic keys. While the computational speed of a PSD is sufficient to carry out all cryptographic calculations, its memory is a scarce resource.

Statistical data are used by postal authorities as an input to calculate customer discounts or use demographics. In another scenario a third party may do customer accounting for franking based on this data. Such data must be protected against any form of malicious manipulations mainly by customers trying to fraudulently get discounts to which they are not entitled. As will be described in some detail below, the statistical data or some derived data set thereof is sent to the PSS 20 as part of a communication session with KMS 17.

The Service Provider/User 11 is the entity having a contractual relationship with the provider of the postage meter system for the use of the PPB Local System 10. The service provider 11 may be a mail house offering franking services to third parties, being thus responsible for the accounting, as well as the correct archiving of postal discounts. It will be appreciated that it may be desired that discounts are granted to the third parties and not to the mail house. In this context, a third party is a customer having one or several bundles of mail pieces to be franked by a Service Provider. The accounting of these services is secured by the PSD's ability to archive and/or sign and forward relevant data identifying postal discounts.

A Postal Statistics Service (PSS) 20 is provided, at the data center, as separate and distinct from the KMS and is responsible for managing postal statistics. The system provides data collection analytical services and forwards the results to the associated postal authorities.

The provider of the postage meter system will send the statistical data used by the Postal Authorities (PA) 18 to calculate the individual discount for customers, through an agreed communication channel to the PA infrastructure 18 for final processing.

A typical PSD 12 has several key management functions which are required to handle the postal indicia and related cryptographic keys. Additionally, the device stores several public/private key pairs and secret keys. Typical crypto functions and algorithms which may be implemented in a PSD include those of a main processor and those of a cryptographic processor. For example, the main processor may provide: an SHA-1 hash algorithm; encryption of arbitrary data using 2-key triple-DES block cipher; calculation of a MAC (message authentication code) based on 2-key triple DES running in CBC-mode; an ANSI X9.17 pseudo-random number generator based on 2-key triple DES (TMS-II code); and the calculation of a 16-bit CRC value for arbitrary data block (without error correction).

Similarly, the cryptographic processor may provide: long-integer arithmetic; generation of DSA public/private key pairs; DSA signature generation and verification algorithms; an ANSI X9.17 pseudo-random number generator based on 2-key triple DES; performance of 2-key triple DES block cipher (PRNG); and a hardware random-bit generator.

As a general matter, there are some aspects of a franking machine which require high security including high confidentiality. These may include the data necessary for creating and printing postal indicia, as well as remote resetting of meter funds. In contrast, for statistical data such as batch data which relate to postal discounts and the like, the main security issue will likely be the data integrity of any statistical data that may be stored on the PPB, while the confidentiality of such data are not of great concern. It is desirable that data integrity for such statistics be protected end-to-end between the PSD 12 and the KMS/PSS 20. Investigation of the possible options for providing such integrity lead to the PSD 12, which for its security properties may be considered as a trusted computing base. While encryption and/or signing of the PSD statistical data is not strictly necessary, such encryption may optionally be provided.

It will be appreciated that one approach is to store batch data in the postage printing base 10 but not within the PSD 12. Then when it is desired to pass such data to the PA 18, the sequence of events is to communicate the batch data from its storage location (which is not within the PSD 12) into the PSD 12. The PSD 12 may then cryptographically sign the data, and the signed data may then be communicated to the PA 18. In this way the data are passed in a reliable way to the PA 18.

Yet another approach is to store batch data in the PSD 12. Then when it is desired to pass such data to the PA 18, the sequence of events is to arrange for the PSD 12 to cryptographically sign the data, and the signed data may then be communicated to the PA 18. In this way the data are passed in a reliable way to the PA 18.

Still another approach is to store batch data may be stored in relatively small amounts and for relatively short periods of time in the PSD, cryptographically signed, and then stored for longer periods of time in the base (but not in the PSD) until a convenient time for a TMS data upload. This approach offers several advantages. A first advantage is that the base does not have the memory limitations that the PSD has, which means that it is not a problem to store even large amounts of data in the base. The base is not, however, as secure as the PSD, and normally one might be concerned that data stored in the base could be exposed to risk of tampering. If the data are cryptographically signed, however, and then stored in the base together with the cryptographic signature, then risk of tampering is greatly reduced, for the simple reason that a would-be tamperer will not be able to "fake" the cryptographic signature.

The storage of signed data within the base (and not within the PSD) may continue for many hours, and perhaps many days or weeks, until the next time of a TMS session. In an exemplary embodiment the storage of signed data is for at least one day.

It should be appreciated that from a security point of view the PPB 10 must be treated as being in an unsecured and potentially hostile environment.

The PSD 12 is thus involved in the processing and protection of statistical data such as batch counts. Transport of statistical data to the PSS 20 is protected by encryption (e.g. by means of a secure session). The mechanism that allows the statistics previously captured within the PSD 12 to be unencrypted and/or unsigned is a secure session that is set up between the PSD 12 and the KMS 17. The secure session may preferably utilize a Diffie-Hellman secret key exchange protocol with the session data triple-DES encrypted.

Plausibility checks of the statistical data may be enacted on the ascending and/or descending register and the item counter managed by the PSD 12 and thus protected against any form of manipulation. These counters allow a straightforward and simple way to check for suspicious behavior. Stated differently, the package of data that include statistical data (such as batch data) may well include the ascending and/or descending register and the item counter, and this will permit straightforward screening of data for plausibility.

The integrity of stored statistical data kept in the PSD 12 is assured by the hardware security of the device itself (i.e. it is unnecessary to protect this data with a digital signature).

The transport of statistical data is sent directly to KMS 17. A secure Diffie-Hellman session is set up between the KMS/PSS 17/20 and the PSD 12. Statistics are uploaded to the KMS/PSS as a function of the KMS business objects to be run. Included in such business objects are such issues as: is rekeying necessary; is a reset being requested; is parameterizing necessary; and are statistics to be uploaded.

The PSD 12 has a predefined limit as to the amount of memory available for secure postal statistics recording. Therefore, in the embodiment in which such batch data are stored in the PSD, to maximize the use of this limited memory space, the data structure to keep the statistical data is chosen to fit within the confines of the available memory.

The storage resources in the PSD 12 to be used for postal statistics are a combination of battery-backed ram (SRAM) on the main processor and $e^2$prom (EEPROM) on its crypto processor. The EEPROM is a secure accessable storage area in the event of a PSD main-processor related hardware failure. The SRAM is used for temporary storage/gathering of postal statistics. This data will be periodically moved to EEPROM.

Moving the postal statistics from SRAM to EEPROM may preferably take place at any of several possible times, for example:

a batch run was completed.

On Demand, namely that the host calls for the statistics to be moved to EEPROM.

a Time Period (such as 24 hours), any statistics during this period held in SRAM will be moved to EEPROM.

based on a Piece-by-Piece Statistics Counter Limit (for example, 255), and when this limit is reached, statistics will be moved to EEPROM.

It is helpful to define what may be termed a "Batch Mode" for a postage meter. This mode provides the fastest rate of franking operations. All frankings are, for example, of the same class and weight. In such a batch mode, one input to the PSD 12 will be the number of sequential mail pieces to accumulate. An initial statistics record will be stored to EEPROM. This record will contain starting information that will allow data recovery in the event of a main-processor related hardware failure. Such starting information may include a Transaction ID and Ascending/Descending Registers. In the event of a main-processor failure, statistics-related data that have not been not transmitted to the PSS 20 would be recovered by access to the EEPROM chip.

Another mode of operation for a postage meter may be a "Dynamic Mode" using a scale such as a dynamic scale 16. This mode has a medium rate of franking operation. Franking classes will vary over the total run.

Still another mode of operation for a postage meter may be a "Single Mode". In such a mode, mail pieces are fed by hand. This mode is the slowest rate of franking operations. Franking classes will vary over the total run.

In a typical arrangement, enough space will be allocated in the PSD 12 to hold 30 days of statistics data. If the storage space runs low the PSD status will notify the HOST that will this data needs to be transmitted to the PSS 20.

The statistical data kept in the PSD 12 are preferably stored there in the form of cumulative records with a revolving buffer accumulating data as long as possible between uploads to the PSS. The basic idea of cumulative statistical data records is to carry out data pre-processing in the PSD 12. This optimizes sparse storage area and avoids unnecessary data traffic. A cumulative statistical data record may be seen as a collection of data of a series of subsequent "identical" mail records, e.g. mail records where the mail-related data sent to the PSD 12 is identical.

By using cumulative records to store statistical data in the PSD 12, the stringent storage requirements for the PSD 12 would not be violated under normal usage conditions between two consecutive postal funds reset operations, i.e. no additional communication overhead should be required for statistical data only.

The capture of statistics data will now be described. The PSD 12 maintains a dynamic statistics record structure. As such, the host provides the PSD 12 with mail/indicia data. Then the PSD 12 increments its data values against the forthcoming mail input. The PSD archiving process will go back and forth between saved records as long as there is no difference in the mail/indicia parameters (e.g. if the PSD 12 cannot equate a new mail/indicia parameter-set against one already recorded, then the PSD will make a new record against the provided parameters). It is then the responsibility of the PSS 20 to sort, combine and provide statistics to the postal authority (e.g. a database could be used to query for statistics to be sorted against any of the parameter fields).

The PSD 12 will not delete these records until the PSS 20 verifies that the records have been successfully received from the PSD. Then the PSD could zero out the records and start over with this memory available for new records.

The method steps according to the invention will now be described in some detail. In an overview, it will be appreciated that several separate or partly statistical-data-linked related processes may be distinguished, namely:

Data entry and preparations for mail records
Data collection in the PSD 12
Data transmission to the PSS 20
Data forwarding to the postal authority.
These will be discussed in turn.

Data Entry and Preparations for Mail Records. During this phase, shown at box 30 of FIG. 2, all relevant data characterizing a mail record are entered or taken from some (e.g. configuration/ mail class identification) files and transferred to the PSD. The PSD establishes the memory archiving structure for the forthcoming mail record and proceeds to store the data as defined in the mail record data construct which is provided to the PSD as part of the mail records communicated to the PSD from the PPB 10, thus allocating the required temporary data structure, which will hold the statistical data. At the end of this preparatory step the PSD is ready to accept data. This may include a human user entering data into the system to identify the batch of mail that is about to be franked.

Data Collection in the PSD. Each time an indicium is generated, this action triggers a well-defined change of the postal registers (ascending/descending register and item counter). A corresponding change of the relevant statistical data (no. of mail pieces, amount, weight) also takes place. This is shown in boxes 31 and 32 of FIG. 2.

Data Transfer to the PSS. The data is preferably transferred as part of an ordinary meter funds reset operation request. In this case the PSD sends the data to the KMS/PSS. To be more precise, the cumulative records are sent as a single data block. Typically this requires a PSD authentication step (box 33) which represents calculation and appending of a MAC, or the data are cryptographically signed. The data passage is shown in boxes 34 and the authentication at 35.

Data Forwarding to Postal Authority. The PSS 20 checks and formats the data to be sent to the Postal Authority 18 (FIG. 1). Following an agreed procedure the statistical data are forwarded by PSS 20 to the Postal Authority 18. This is shown in box 36.

The message flow will now be described in greater detail. First, as a precondition, the PSD will have already stored a private/public key pair for authentication. The public key will have been certified by the local KMS CA authority.

Figure 2:
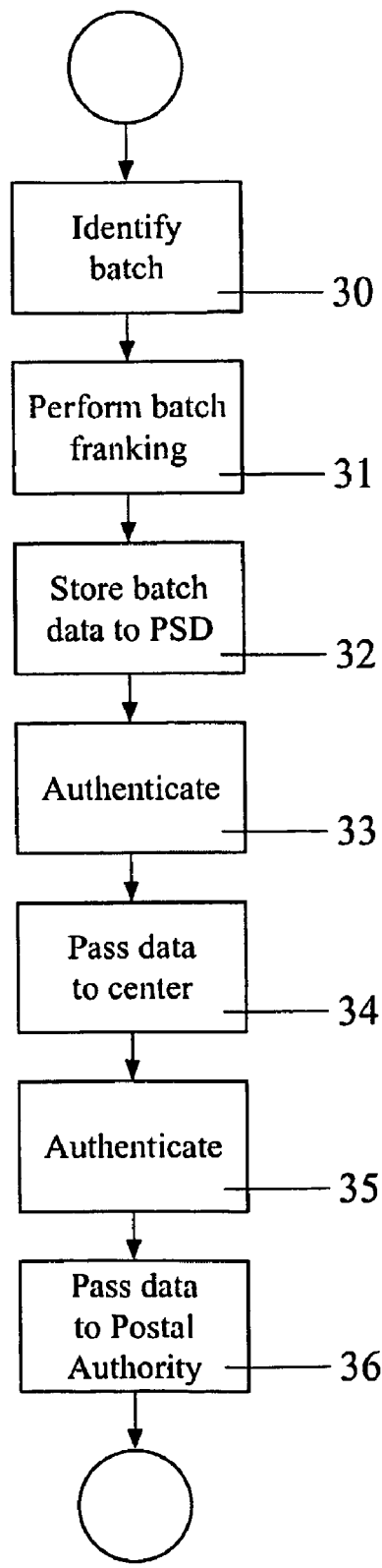
FIG. 2 is a flow chart depicting a method according to the invention.

A typical first process is protected by a Diffie-Helman key session. The PSD will prepare and encode data, it will send data to the PSS 20 (FIG. 1), and it will set its Block_Status flag to "sent". The PSS 20 will send confirmation of correct receipt of the data. When the PSD 12 receives this confirmation, it will set its Block_Status flag to "received." It may then zeroize its statistical data, which is an important step given the limited memory resources of the PSD 12. Next, the PSS 23 may perform further processing of the statistical (e.g. batch) data and will then send the statistical data to the postal authority 18 (FIG. 1) as shown in FIG. 2, box 36.

In a typical arrangement, the statistics will be retrieved from the PSD 12 as data extraction to the Postal Statistics Service 20. A sockets/TCP/IP interface will be utilized to communicate the statistics from the Host to the Postal Statistics Service (PSS) 20. The PSS application accumulates, combines, sorts, and parses per the requirements of the postal authority. The PSS 20 further provides formatted statistics to the postal authority per its requirements (e.g. electronically, mail, or hand-carry).

Statistics must be retrieved from the PSD 12 per requirements of the postal authority (e.g. periodically). After statistics retrieval, from the PSD, by the Host, the PSD will not allow further franking until it receives confirmation that the statistics have been successfully transmitted to the Statistics Service. The reason for this constraint relates to the possibility that the Host fails and loses the statistics retrieved from the PSD prior to transmitting them to the Statistics Service, thus the PSD retains the backup of the statistics.

The PSD statistics application will maintain related records in the battery-backed RAM for a batch run or for a given number of indicia. After a predefined period expires, or upon command, a summary of the data collected in the battery backed RAM will be stored into the crypto chip EEPROM memory. The battery-backed RAM will continue to accumulate statistics for existing records and add new records as required, and again after some period, write its summary to the crypto chip.

The most recent saved statistics summary from the battery-backed RAM to the crypto chip represents the total statistics at that point in time. Consequently, there is never a need to monitor how much crypto chip memory is being used.

Alternatively, the statistical data are, as mentioned above, stored in the PPB but not in the PSD. In such a case, the data are communicated into the PSD, and then communicated in a cryptographically secure way to the PA.

Those skilled in the art will readily devise myriad obvious improvements and variations upon the invention, all of which are intended to be encompassed within the claims that follow. For example, it is possible to store directly to the cryptographic processor memory and bypassing the battery-backed RAM storage process.

The invention claimed is:

1. A method for use with a postage meter system under the jurisdiction of a postal authority, the postage meter system comprising a host and a server, the host comprising a postal security device and postal indicia printing means, the server comprising cryptographic device disposed for cryptographically secure communication with the postal security device, the method comprising the steps of:
    entering information into the host indicative of a batch of mail pieces to be franked;
    franking the mail pieces whilst storing information about the franking of the batch of mail pieces to a memory within the host;
    within the postal security device, performing a cryptographic authenticating procedure upon the information about the franking of the batch and the information indicative of the batch, said information defining statistical information;
    communicating the statistical information from the postal security device to the cryptographic device;
    authenticating the statistical information at the cryptographic device; and
    passing the statistical information to a postal authority.

2. The method of claim 1 wherein
    the step of performing the cryptographic authenticating procedure comprises calculating a message authentication code, and
    the step of authenticating the statistical information comprises checking for correctness of the message authentication code.

3. The method of claim 1 wherein
    the step of performing the cryptographic authenticating procedure comprises digitally signing the statistical information, and
    the step of authenticating the statistical information comprises checking for correctness of the digital signature.

4. The method of claim 1 wherein the communicating step further comprises establishing a cryptographically secure session and communicating the information in a cryptographically secure fashion.

5. The method of claim 1 wherein the communicating step is performed in the absence of the establishment of a cryptographically secure session.

6. The method of claim 1 further comprising
    the step of passing a confirmation from the cryptographic device to the postal security device indicative of receipt by the cryptographic device from the postal security device, and
    the further step of deleting the statistical information from the postal security device upon receipt of the confirmation.

7. The method of claim 1 further comprising the step, performed by the postal authority, of granting a discount based on the statistical information.

8. The method of claim 1 further comprising the step, performed by the postal authority, of granting a credit for future franking based on the statistical information.

9. The method of claim 1 wherein the memory within the host is within the postal security device.

10. The method of claim 1 wherein the memory within the host is not within the postal security device.

11. The method of claim 1 where the step of communicating the statistical information from the postal security device to the cryptographic device further comprises the steps of:
    cryptographically signing the statistical information within the postal security device, yielding a signature;
    communicating the information and signature to memory within the host and not within the postal security device;
    storing the information and signature within the memory within the host and not within the postal security device, and
    communicating the information and signature from memory within the host and not within the postal security device, to the cryptographic device.

12. The method of claim 11 wherein the storing of the information and signature within the memory within the host and not within the postal security device is for at least one day.

13. A method for use with a postage meter system under the jurisdiction of a postal authority, the postage meter system comprising a host and a server, the host comprising a postal security device and postal indicia printing means, the server comprising a cryptographic device disposed for cryptographically secure communication with the postal security device, the host operated by a service provider providing service to a plurality of users, the method comprising the steps of:
    entering information into the host indicative of a batch of mail pieces to be franked and indicative of an identity of a user associated with the batch;
    franking the mail pieces whilst storing information about the franking of the batch of mail pieces to a memory within the host;
    within the postal security device, performing a cryptographic authenticating procedure upon the information about the franking of the batch and the information indicative of the batch, said information defining statistical information;
    communicating the statistical information from the postal security device to the cryptographic device;
    authenticating the statistical information at the cryptographic device; and
    passing the statistical information to a postal authority.

14. The method of claim 13 wherein
    the step of performing the cryptographic authenticating procedure comprises calculating a message authentication code, and
    the step of authenticating the statistical information comprises checking for correctness of the message authentication code.

15. The method of claim 13 wherein
    the step of performing the cryptographic authenticating procedure comprises digitally signing the statistical information, and
    the step of authenticating the statistical information comprises checking for correctness of the digital signature.

16. The method of claim 13 wherein the communicating step further comprises establishing a cryptographically secure session and communicating the information in a cryptographically secure fashion.

17. The method of claim 13 wherein the communicating step is performed in the absence of the establishment of a cryptographically secure session.

18. The method of claim 13 further comprising
    the step of passing a confirmation from the cryptographic device to the postal security device indicative of receipt by the cryptographic device from the postal security device, and the further step of deleting the statistical information from the postal security device upon receipt of the confirmation.

19. The method of claim 13 further comprising the step, performed by the postal authority, of granting a discount to the user associated with the batch based on the statistical information.

20. The method of claim 13 further comprising the step, performed by the postal authority, of granting a credit for future franking to the user associated with the batch based on the statistical information.

21. The method of claim 13 wherein the memory within the host is within the postal security device.

22. The method of claim 13 wherein the memory within the host is not within the postal security device.

23. The method of claim 13 where the step of communicating the statistical information from the postal security device to the cryptographic device further comprises the steps of:

cryptographically signing the statistical information within the postal security device, yielding a signature;

communicating the information and signature to memory within the host and not within the postal security device;

storing the information and signature within the memory within the host and not within the postal security device, and communicating the information and signature from memory within the host and not within the postal security device, to the cryptographic device.

24. The method of claim 23 wherein the storing of the information and signature within the memory within the host and not within the postal security device is for at least one day.

* * * * *